(12) United States Patent
Chaturvedi et al.

(10) Patent No.: US 12,483,108 B2
(45) Date of Patent: Nov. 25, 2025

(54) CALIBRATED ZERO INDUCTOR CURRENT DETECTION IN DIRECT CURRENT (DC) TO DC CONVERTERS

(71) Applicant: Qorvo US, Inc., Greensboro, NC (US)

(72) Inventors: Vikram Chaturvedi, Utrecht (NL); Salvatore Pirruccio, Woudenberg (NL)

(73) Assignee: Qorvo US, Inc., Greensboro, NC (US)

( * ) Notice: Subject to any disclaimer, the term of this patent is extended or adjusted under 35 U.S.C. 154(b) by 364 days.

(21) Appl. No.: 18/117,545

(22) Filed: Mar. 6, 2023

(65) Prior Publication Data

US 2023/0318431 A1 Oct. 5, 2023

Related U.S. Application Data

(60) Provisional application No. 63/325,909, filed on Mar. 31, 2022.

(51) Int. Cl.
*H02M 3/158* (2006.01)
*G01R 19/10* (2006.01)
*H02M 1/00* (2006.01)

(52) U.S. Cl.
CPC .......... *H02M 1/0009* (2021.05); *G01R 19/10* (2013.01); *H02M 1/0054* (2021.05); *H02M 3/158* (2013.01); *H02M 3/1584* (2013.01)

(58) Field of Classification Search
CPC ...... H02M 3/158; H02M 1/0058; H02M 1/08; H02M 1/0009; H02M 3/1584; G01R 19/10
See application file for complete search history.

(56) References Cited

U.S. PATENT DOCUMENTS

| 12,142,931 B1* | 11/2024 | Santos Martinez ..... H02J 50/12 |
| 2011/0018516 A1* | 1/2011 | Notman ............... H02M 3/1588 323/284 |

(Continued)

FOREIGN PATENT DOCUMENTS

| KR | 101996963 B1 | 7/2019 |
| KR | 102244444 B1 | 4/2021 |

OTHER PUBLICATIONS

Park, Y.- J. et al., "A Design of a 92.4% Efficiency Triple Mode Control DC-DC Buck Converter With Low Power Retention Mode and Adaptive Zero Current Detector for IoT/Wearable Applications," IEEE Transactions on Power Electronics, vol. 32, Issue 9, Sep. 2017, first published Nov. 2016, IEEE, pp. 6946-6960.

(Continued)

*Primary Examiner* — Sean Kayes
*Assistant Examiner* — Jonathan Walter Soileau
(74) *Attorney, Agent, or Firm* — Withrow & Terranova, P.L.L.C.

(57) ABSTRACT

Power efficiency can be optimized in a direct current (DC)-DC converter in discontinuous conduction mode (DCM) if a transition from a state of decreasing inductor current to a state of zero inductor current occurs as close as possible to the decreasing inductor current reaching zero. The timing of a zero current indication is affected by a voltage offset and a propagation delay of a comparator. A DC-DC converter, including a control circuit for accurate detection of zero inductor current, is disclosed. A control circuit calibrates an offset voltage for a load, stores a corresponding offset value, and in response to powering the load, provides an offset voltage to the comparator based on the stored offset value. In some examples, the control circuit determines an offset voltage and stores an offset value for each voltage and (Continued)

switch width combination. Using stored offset values increases accuracy of zero inductor current detection.

19 Claims, 5 Drawing Sheets

(56) References Cited

U.S. PATENT DOCUMENTS

| | | | |
|---|---|---|---|
| 2016/0118906 A1* | 4/2016 | Freeman | H02M 3/33515 363/21.05 |
| 2017/0012529 A1 | 1/2017 | Yamada et al. | |
| 2019/0044442 A1 | 2/2019 | Schaef | |
| 2021/0247788 A1* | 8/2021 | Chen | H02M 3/158 |
| 2023/0113610 A1* | 4/2023 | Chen | H02M 3/158 |
| 2023/0118761 A1* | 4/2023 | Kim | H02M 1/38 323/271 |

OTHER PUBLICATIONS

Prummel, J. et al., "A 10 mW Bluetooth Low-Energy Transceiver With On-Chip Matching," IEEE Journal of Solid-State Circuits, vol. 50, Issue 12, Dec. 2015, first published Sep. 2015, IEEE, pp. 3077-3088.

Schaef, C. et al., "8.5 A Fully Integrated Voltage Regulator in 14nm CMOS with Package-Embedded Air-Core Inductor Featuring Self-Trimmed, Digitally Controlled Variable On-Time Discontinuous Conduction Mode Operation," 2019 IEEE International Solid-State Circuits Conference—(ISSCC), Feb. 17-21, 2019, San Francisco, CA, USA, IEEE, 3 pages.

Meng, X. et al., "Real Time Zero Current Detection with Low Quiescent Current for Synchronous DC-DC Converter," 2017 IEEE 26th International Symposium on Industrial Electronics (ISIE), Jun. 19-21, 2017, Edinburgh, UK, IEEE, pp. 839-843.

Yoon, K.- S. et al., "Zero Current Detector with Slope Judgment Calibration in Mobile Battery Charger IC," IEEE Asian Solid-State Circuits Conference, Nov. 7-10, 2021, Busan, Korea, 3 pages.

Extended European Search Report for European Patent Application No. 23162145.9, mailed Jul. 24, 2023, 13 pages.

* cited by examiner

CALIBRATED ZERO INDUCTOR CURRENT DETECTION IN DIRECT CURRENT (DC) TO DC CONVERTERS

PRIORITY CLAIM

The present application claims priority to U.S. Provisional Patent Application Ser. No. 63/325,909 filed on Mar. 31, 2022, and entitled "CALIBRATED ZERO INDUCTOR CURRENT DETECTION IN DIRECT CURRENT (DC) TO DC CONVERTERS," the contents of which are incorporated herein by reference in its entirety.

FIELD OF THE DISCLOSURE

The technology of the disclosure relates generally to direct-current (DC) to DC power converters and, more particularly, to DC-DC converters that operate in discontinuous conduction mode.

BACKGROUND

Trends in electronics technologies drive integrated circuits (ICs) to be smaller, have higher performance, and consume less power. Performance can be increased, and power consumption can be reduced by reducing an operating voltage of an IC. When an operating voltage is reduced, capacitive charging is reduced, which reduces circuit delays and the amount of power wasted in charging and discharging circuits. A power supply provides a direct current (DC) voltage to an IC, and the supply voltage from the power supply may be higher than a load voltage of an IC. For example, a power supply may be a battery providing power to multiple devices with different load voltages. When the supply voltage is different than a load voltage, a DC-DC converter can be employed to convert a supply voltage from a power supply to a load voltage of an IC.

DC-DC converters include types known as buck, boost, and buck/boost converters. These types of DC-DC converters can convert a supply voltage on an input to a load voltage on an output coupled to a load, where the load voltage is different than the supply voltage. Each of the above types of DC-DC converters includes an inductor, at least one capacitor, and at least one switch. In a buck converter, for example, the switch may be controlled by at least one clock signal with the following different clock states. In a first clock state, a power supply providing a supply voltage is applied across the inductor to cause an increasing current. In a second clock state, the inductor is decoupled from the power supply and coupled to a reference node, causing the inductor current to the capacitor to decrease. The buck converter may return to the first clock state directly from the second clock state before the inductor current decreases to zero. Alternatively, a buck converter in discontinuous conduction mode (DCM) can also operate in a third clock state without an inductor current after the inductor current decreases to zero in the second clock state. The detection of zero inductor current may trigger a transition from the second clock state to the third clock state.

SUMMARY

Aspects disclosed in the detailed description include calibrated zero current detection in direct-current (DC) to DC (DC-DC) converters. Related methods of calibrating a DC-DC converter for zero current detection are also disclosed. Power efficiency can be optimized in a DC-DC converter in discontinuous conduction mode (DCM) if a transition from a state of decreasing inductor current to a state of zero inductor current occurs as close as possible to the decreasing inductor current reaching zero. In a comparator used to detect zero inductor current, the timing of a zero current indication is affected by a voltage offset between the inputs and a propagation (time) delay of the comparator. In addition, when a DC-DC converter has loads at a different voltage, the rate of inductor current decrease varies with the load. In exemplary aspects, a DC-DC converter, including a control circuit for timely and accurate detection of zero inductor current, is disclosed. An exemplary control circuit may calibrate an offset voltage for a load, store a corresponding offset value, and provide an offset voltage to the comparator based on the stored offset value in response to powering the load. In some examples, the control circuit determines an offset voltage and stores an offset value for each combination of voltage and load. Using offset values generated and stored in a calibration process increases the accuracy of zero inductor current detection in a DC-DC converter.

In exemplary aspects, a DC-DC converter is disclosed. The DC-DC converter comprises an inductor coupled to a first capacitor to charge the first capacitor and a switch circuit coupled to the inductor. The switch circuit couples the inductor to a power supply in a first clock state, couples the inductor to a reference voltage node in a second clock state, and decouples the inductor from the power supply and the reference voltage node in a third clock state. The DC-DC converter also comprises a comparator that generates a zero current indication in the second clock state in response to detecting zero current in the inductor and a control circuit that controls the first clock signal and the second clock signal to switch from the second clock state to the third clock state in response to the zero current indication and provides an offset voltage to the comparator based on a stored offset value.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

Figure 1:
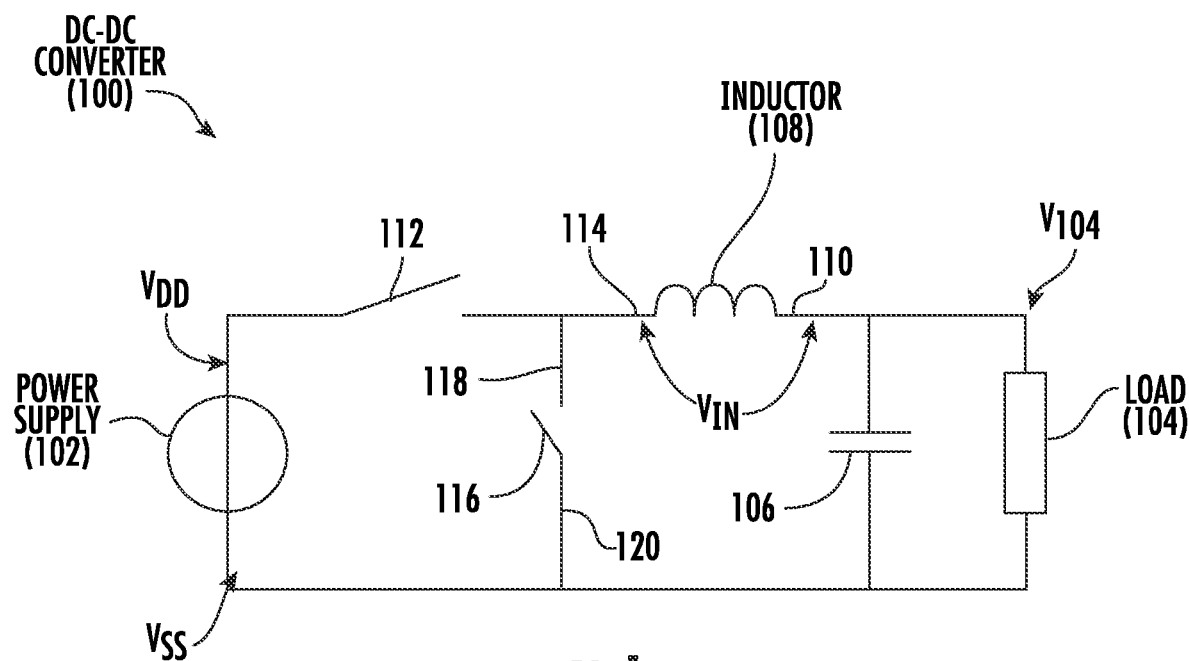
FIG. 1 is a schematic diagram of a conventional buck-type direct-current (DC) to DC (DC-DC) voltage converter.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that although the terms first, second, etc., may be used herein to describe various elements, these elements should not be limited by these terms. These terms are only used to distinguish one element from another. For example, a first element could be termed a second element, and similarly, a second element could be termed a first element without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element, or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element, or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Relative terms such as "over" or "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include calibrated zero current detection circuits for direct-current (DC) to DC (DC-DC) converters. Related methods of calibrating a DC-DC converter for zero current detection are also disclosed. Power efficiency can be optimized in a DC-DC converter in discontinuous conduction mode (DCM) if a transition from a state of decreasing inductor current to a state of zero inductor current occurs as close as possible to the decreasing inductor current reaching zero. In a comparator used to detect zero inductor current, the timing of a zero current indication is affected by a voltage offset between the inputs and a propagation (time) delay of the comparator. In addition, when a DC-DC converter has loads at different voltage and/or current levels, the rate of inductor current decrease varies with the load. In exemplary aspects, a DC-DC converter, including a control circuit for timely and accurate detection of zero inductor current, is disclosed. An exemplary control circuit may calibrate an offset voltage for a load, store a corresponding offset value, and provide an offset voltage to the comparator based on the stored offset value in response to powering the load. In some examples, the control circuit determines an offset voltage and stores an offset value for each combination of voltage and load. Using offset values generated and stored in a calibration process increases the accuracy of zero inductor current detection in a DC-DC converter.

Figure 3:
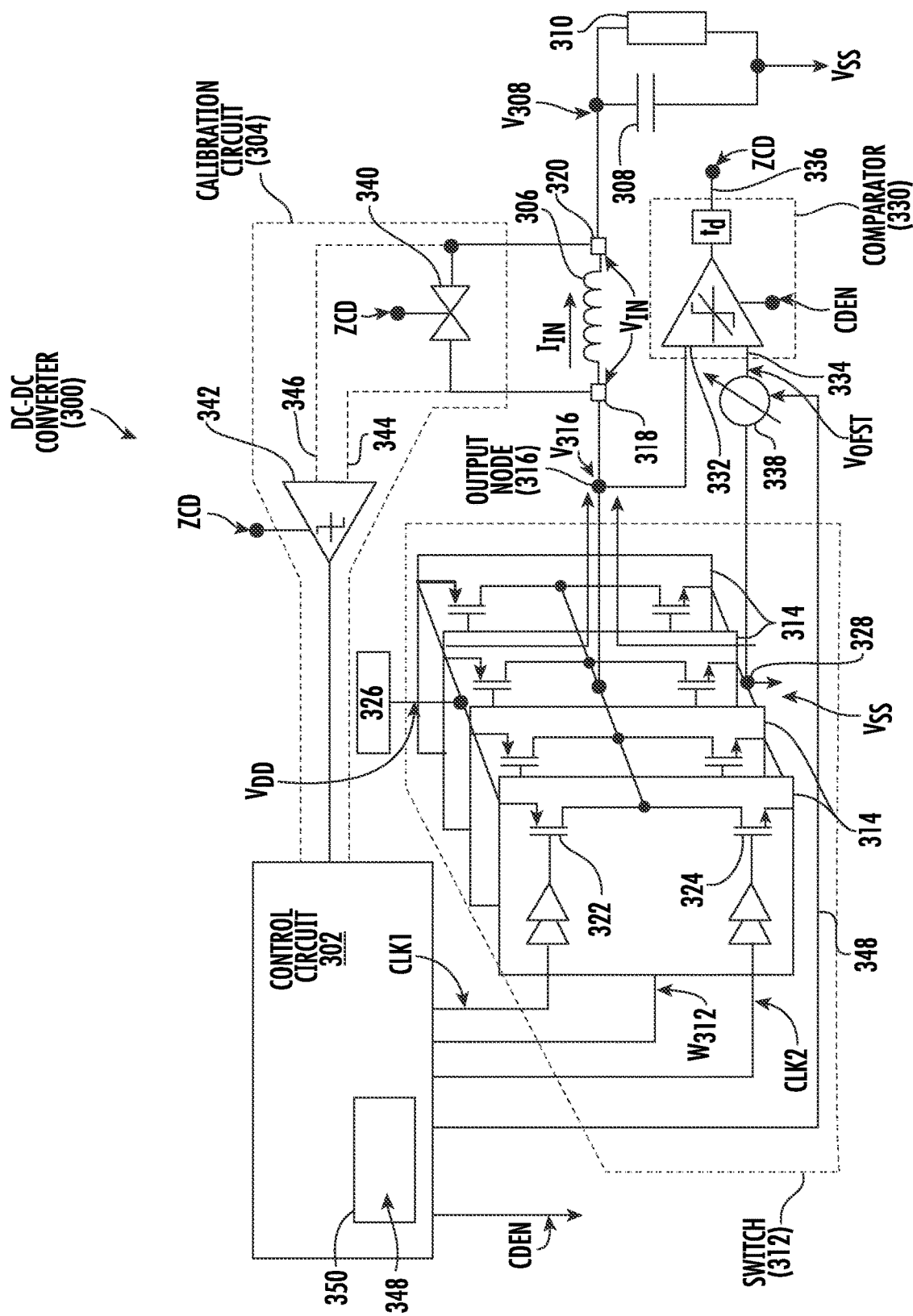
FIG. 3 is a schematic diagram of an exemplary DC-DC converter, including a control circuit with an offset voltage calibration circuit to improve power efficiency.

Before discussing aspects of an exemplary DC-DC converter in FIG. 3, a brief discussion of a buck DC-DC converter operating in DCM is first provided. FIG. 1 is a schematic diagram of a buck-type DC-DC converter 100 coupled to a power supply 102 that provides a DC supply voltage $V_{DD}$ and provides a load voltage $V_{104}$ to a load 104. The load 104 may be seen as a resistive load. The load voltage $V_{104}$ is different than the supply voltage $V_{DD}$. In this example, the load voltage $V_{104}$ is lower than the supply voltage $V_{DD}$, and the DC-DC converter 100 is a buck-type converter. In some examples, the load voltage $V_{104}$ may be higher than the supply voltage $V_{DD}$, and in such cases, a boost-type converter may be used. The DC-DC converter 100 provides the load voltage $V_{104}$ by periodically charging a capacitor 106, which is coupled in parallel to the load 104. The load 104 is powered by the charge on the capacitor 106. The capacitor 106 may be continuously discharged through the load 104, but the capacitor 106 is periodically recharged as described below.

The DC-DC converter 100 includes an inductor 108 with a first terminal 110 coupled to the capacitor 106 and the load 104. The DC-DC converter 100 also includes a switch 112 coupled between a second terminal 114 of the inductor and the power supply 102. In this regard, the supply voltage $V_{DD}$ may be provided to the second terminal 114 of the inductor 108 when the switch 112 is activated (e.g., closed). The DC-DC converter 100 also includes a switch 116 with a cathode 118 coupled to the second terminal 114 of the inductor 108 and an anode 120 receiving a reference voltage $V_{SS}$ (e.g., 0 volts, ground).

Figure 2:
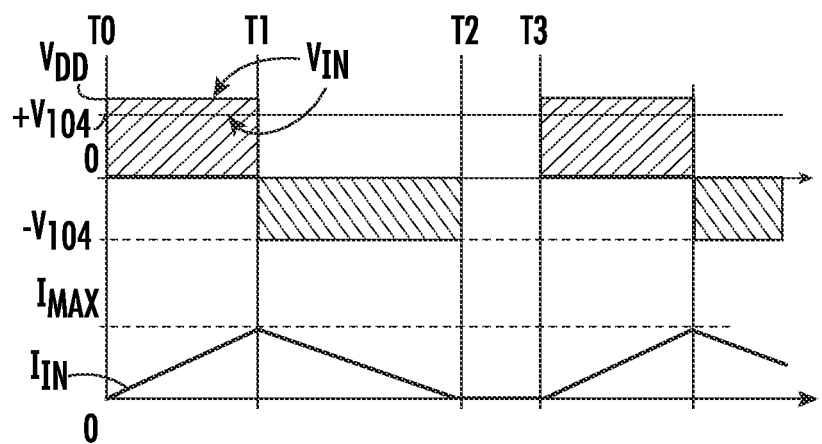
FIG. 2 is a timing diagram illustrating current and voltage of the buck DC-DC converter in FIG. 1 during discontinuous conduction mode (DCM)

Operation of the DC-DC converter 100 in DCM includes three states described with reference to FIG. 1 and the timing diagram in FIG. 2. FIG. 2 is a timing diagram illustrating an inductor current $I_{IN}$ and an inductor voltage $V_{IN}$ across the inductor 108 of the DC-DC converter 100 in FIG. 1 in discontinuous conduction mode (DCM).

In a first state, from time T0 to time T1, the switch 112 is closed to provide the supply voltage $V_{DD}$ to the second terminal 114 of the inductor 108. FIG. 2 shows the voltage $V_{DD}$ is provided to the first terminal 110 at time T0 and maintained until time T1. Since there is a voltage $V_{104}$ applied to the load 104 by the capacitor 106, an input voltage $V_{IN}$ across the inductor 108 is $V_{DD}$-$V_{104}$. The voltage $V_{IN}$ causes the inductor current $I_{IN}$ in the inductor 108 to increase to $I_{MAX}$ at time T1. The switch 116 is open during the first state, so no current is flowing in the switch 116, and the inductor current $I_{IN}$ charges the capacitor 106. At time T1, the switch 112 is opened, and the switch 116 is closed to transition the DC-DC converter 100 from the first state to the second state. Opening the switch 112 disconnects the second terminal 114 of the inductor 108 from the power supply 102. The inductor current $I_{IN}$ is drawn through the switch 116 between time T1 and time T2, supplying the reference voltage $V_{SS}$ to the second terminal 114, as shown in FIG. 2. Supplying the voltage $V_{SS}$ to the first terminal 110 causes the inductor current $I_{IN}$ to decrease from time T1 to time T2. At time T2, the inductor current $I_{IN}$ has decreased to zero, meaning that no current (e.g., 0 amperes) or substantially no current is flowing in the inductor 108.

Current is flowing in the positive direction through the inductor 108 to charge the capacitor 106 during the first state and the second state (i.e., from time T0 to time T2). Time T2 is the end of the second state and the beginning of the third state, which occurs when zero inductor current $I_{IN}$ is detected in the inductor 108. The inductor current $I_{IN}$ has decreased to zero and will continue to decrease to a negative current if the first switch state persists. A negative current $I_{IN}$ in the inductor 108 would discharge the capacitor 106. To avoid wasting power in this manner, the switch 116 is closed before the inductor current $I_{IN}$ becomes negative. However, closing the switch 116 prior to the inductor current $I_{IN}$ reaching zero would waste energy that has been created in the inductor 108 during the first clock state. Detecting the moment at which the inductor current $I_{IN}$ reaches zero and opening the switch 116 at that moment maximizes the efficiency of the DC-DC-converter 100. With the switch 112 open and the switch 116 open, there is no inductor current $I_{IN}$ (zero inductor current) through the inductor 108 during the third state. The capacitor 106 continues to be discharged through the load 104 between time T2 and time T3. The DC-DC converter 100 stays in the third state until time T3, at which time the switch 110 is closed to start the first state (e.g., from T3 to T4) of a new cycle, and the above progression is repeated. Depending on the respective durations of the first, second, and third states, and other factors such as the inductance of the inductor 108 and the capacitance of the capacitor 106, the supply voltage needed for operation of the load 104 will be maintained or nearly maintained in the capacitor 106.

FIG. 3 is a schematic diagram of an exemplary DC-DC converter 300, including a control circuit 302, which further includes a calibration circuit 304 for accurate detection of zero inductor current to improve power efficiency in a user device. The calibration circuit 304 determines, and stores offset values associated with each output voltage and load combination provided by the DC-DC converter 300 to improve zero current detection. In this example, the control circuit 302 generates the first clock signal CLK1 and the second clock signal CLK2, but the first clock signal CLK1 and the second clock signal CLK2 may be provided from an external circuit. Details of the calibration circuit 304 and operation thereof are more fully appreciated following a description of the DC-DC converter 300.

The DC-DC converter 300 includes an inductor 306 coupled to a capacitor 308 to charge the capacitor 308 to a load voltage $V_{308}$. The inductor 306 provides an inductor current $I_{IN}$ to a capacitor 308. A load 310 is coupled to the capacitor 308 and powered by a voltage $V_{308}$ of the capacitor 308. As in the example in FIG. 1, the DC-DC converter 300 is operated in discontinuous conduction mode (DCM), and various parameters are used to set the voltage $V_{308}$ on the capacitor 308 to an operating voltage of the load 310.

The DC-DC converter 300 further includes a switch circuit 312, also referred to as switch 312, including a plurality of switch slices 314 coupled to the inductor 306. The switch 312 receives a width signal $W_{312}$ indicating a number of the switch slices 314 to be activated. A number of the switch slices 314 can be activated by the width signal $W_{312}$ to operate in parallel to efficiently handle different current requirements of different loads, as discussed in more detail below. The switch 312 includes an output node 316 that is coupled to a first terminal 318 of the inductor 306 and a second terminal 320 of the inductor 306 is coupled to the capacitor 308. A voltage $V_{IN}$ between the first terminal 318 and the second terminal 320 creates the inductor current $I_{IN}$ in the inductor 306. In the DC-DC converter 300, the switch 312 in FIG. 3 includes four (4) switch slices 314, but there may be more or fewer switch slices 314 as needed. As the number of switch slices 314 increases, resistance through the switch 312 decreases. The width signal $W_{312}$ is received in the switch 312 from the control circuit 302 to designate the number of switch slices 314 activated to operate in parallel. An activated switch slice 314 is responsive to the first clock signal CLK1 and the second clock signal CLK2.

The switch 312 is controlled by the control circuit 302 to execute the three states of DCM operation. In response to the first clock signal CLK1 and the second clock signal CLK2, the switch 312 couples the inductor 306 to the power supply 326 providing the supply voltage $V_{DD}$ in the first clock state, couples the inductor 306 to a reference voltage node 328 in the second clock state, and decouples the inductor 306 from the power supply 326 and the reference voltage node 328 in the third clock state. The reference voltage node supplies a reference voltage $V_{SS}$ and the power supply provides the supply voltage $V_{DD}$.

Each of the switch slices 314 includes a power switch 322 to couple the power supply 326 to the output node 316 and a ground switch 324 to couple the reference voltage node 328 to the output node 316. The power switch 322 is controlled by a first clock signal CLK1 and the ground switch 324 is controlled by the second clock signal CLK2. The states of the DC-DC converter 300 are controlled by the first clock signal CLK1 and a second clock signal CLK2 and are referred to herein as "clock states." Specifically, the DC-DC converter 300 operates in a first clock state in which the first clock signal CLK1 is active and the second clock signal CLK2 is inactive. In a second clock state, the first clock signal CLK1 is inactive, and the second clock signal CLK2 is active. Both the first clock signal CLK1 and the second clock signal CLK2 are inactive in a third clock state.

Figure 4:
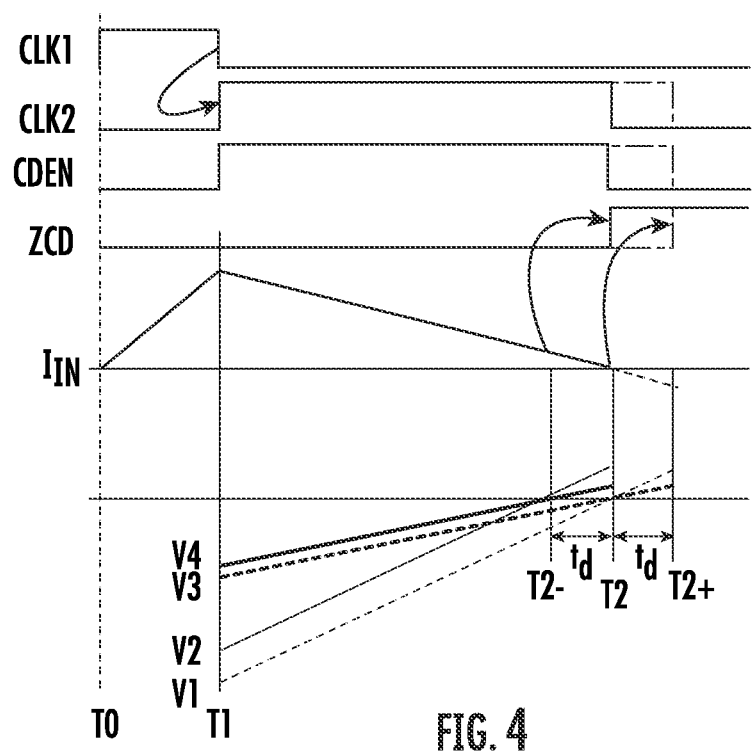
FIG. 4 is a timing diagram of signals in the DC-DC converter 300 illustrating an improvement in zero current detection from an offset voltage.

Operation of the DC-DC converter 300 in each of the first, second, and third clock states is described below with reference to FIG. 4. FIG. 4 is a timing diagram of signals in the DC-DC converter 300 illustrating an improvement in zero current detection from offset voltage. At time T0, the first clock signal CLK1 is activated by, for example, being set to a voltage that turns on the power switch 322. In some examples, the power switch 322 may be a P-type metal-oxide-semiconductor (MOS) (PMOS) device, such as a P-type field-effect transistor (FET) (PFET), and the first clock signal CLK1 may be set to 0 volts to activate (i.e., turn on) the power switch 322. Alternatively, the power switch 322 may be an NMOS device activated by the first clock signal CLK1 being set to the supply voltage $V_{DD}$.

When the power switch 322 is turned on at time T0, the supply voltage $V_{DD}$ of the power supply 326 is provided to the output node 316 and also to the first terminal 318 of the inductor 306. In response to the supply voltage $V_{DD}$, the inductor current $I_{IN}$ increases. When the inductor current $I_{IN}$ becomes greater than a current to the load 310 in the first clock state, the capacitor 308 is charged. As shown in FIG. 4, the first clock signal CLK1 is active (high) from time T0 to time T1 for the first clock state when the power switch 322 is deactivated (turned off) and the output node 316 is decoupled from the power supply 326.

Also at time T1, the second clock signal CLK2 is activated to turn on the ground switch 324 to couple the output node 316 to the reference voltage node 328. Thus, the first clock state ends, and the second clock state begins when the first clock signal CLK1 is turned off at the same time (T1) that the second clock signal CLK2 is turned on. The ground switch 324 may be an N-type MOS (NMOS) device, such as an N-type FET (NFET) that is activated by the second clock signal CLK2 being set to the supply voltage $V_{DD}$ for example. Alternatively, the ground switch 324 could be a P-type MOS device, for example. The reference voltage node 328 provides the reference voltage $V_{SS}$ to the first terminal 318 of the inductor 306. With the reference voltage $V_{SS}$ applied to the first terminal 318 at time T1, the inductor current $I_{IN}$ in the inductor 306 begins to decrease. The inductor current $I_{IN}$ decreases to zero (e.g., amperes) in the second clock state until zero inductor current (e.g., inductor current $I_{IN}$=0 amperes) is detected by a comparator 330. The comparator 330 generates a zero current indication ZCD in the second clock state in response to detecting zero current (e.g., $I_{IN}$=0) in the inductor 306. The zero current indication ZCD triggers the transition from the second clock state to the third clock state at time T2. Specifically, the control circuit 302 controls the first clock signal CLK1 and the second clock signal CLK2 to switch from the second clock state to the third clock state in response to receiving the zero current indication ZCD from the comparator 330. Inaccuracy in the detection of zero inductor current can reduce the power efficiency of the DC-DC converter 300.

At time T2, the second clock signal CLK2 is deactivated to turn off the ground switch 324, ending the second clock state and beginning the third clock state. The deactivated ground switch 324 decouples the output node 316 from the reference voltage node 328, and the first clock signal CLK1 remains deactivated. Thus, in the third clock state, the output node 316 is floating (i.e., not coupled to a voltage source), and the inductor current $I_{IN}$ remains at zero. As described further below, a freewheel switch 340 may be provided across the inductor 306, which will avoid parasitic ringing in the third clock state. The capacitor 308 is discharged as it provides power to the load 310 while there is zero inductor current $I_{IN}$.

As noted above, inaccurate detection of the inductor current $I_{IN}$ reaching zero can reduce power efficiency. Specifically, the timing of deactivating the ground switch 324 to transition from the second clock state to the third clock state in every cycle can determine whether energy in the inductor 306 is wasted or the capacitor 308 is discharged. If the ground switch 324 is shut off too early, a positive inductor current $I_{IN}$ would be interrupted, causing energy in the inductor 306 to be dissipated, reducing efficiency. For example, this energy may be dissipated due to a resistance in the freewheel switch 340. On the other hand, if the ground switch 324 is shut off too late, the inductor current $I_{IN}$ reaches zero while the inductor 306 is still coupled to the reference voltage node 328, and the voltage $V_{IN}$ on the capacitor 308 may create a negative inductor current $I_{IN}$, dumping the charge on the capacitor 308 to the reference voltage node 328.

Detection of the zero inductor current condition, when the inductor current $I_{IN}$ reaches zero in the second clock state, is performed by the comparator 330 in response to a current detection enable signal CDEN. The current detection enable signal CDEN is activated during the second clock state. The comparator 330 indicates a zero inductor current $I_{IN}$ is detected when inputs 332, 334 are at the same voltage. The first input 332 is coupled to the first terminal 318 of the inductor 306. The second input 334 of the comparator 330 is coupled to the reference voltage node 328, which is at zero volts (e.g., $V_{SS}$) in this example. Thus, the condition of zero inductor current $I_{IN}$ should be detected when the voltage on the first terminal 318 (or output node 316) is zero volts, which corresponds to the inductor current $I_{IN}$ reaching zero amperes. However, comparators 330 are formed of physical components with electrical characteristics that can vary depending on manufacturing conditions. Such variations can cause an imbalance that creates an internal voltage offset. For example, the input 332 can have a voltage offset from the input 334. A voltage offset can cause the comparator 330 to indicate that the inputs are at the same voltage when there is actually a difference in voltage between the inputs 332 and 334. To overcome this difference, the voltage offset can be determined and an offset voltage is used to adjust a voltage on the reference voltage $V_{SS}$ For example, on one of the inputs 332 and 334 to compensate for the internal voltage offset. In FIG. 3, the input 334 is coupled to the reference voltage node 328 through an offset voltage generator 338. The reference voltage node 328 supplies the reference voltage $V_{SS}$ to the offset voltage generator 338, which supplies the offset voltage $V_{OFST}$ on the input 334 of the comparator 330 based on a stored offset value 348. The offset voltage generator may add the reference voltage $V_{SS}$ and a voltage based on the stored offset value to generate the offset voltage $V_{OFST}$.

Another source of error in detecting zero current in the comparator 330 is a propagation delay $t_d$ (time delay $t_d$) from detecting that a voltage $V_{316}$ on the output node 316, which is provided to input 332, matches the offset voltage $V_{OFST}$ on the input 334 to generate the zero current indication on an output 336 of the comparator 330. The voltage $V_{IN}$ on the input 332 matches the offset voltage $V_{OFST}$ on the input 334 when the voltage $V_{IN}$ and the offset voltage $V_{OFST}$ differ by the voltage offset of the comparator 330. Zero inductor current is indicated by the zero current detection signal ZCD on the output 336 when enabled by the current detection enable signal CDEN. The time delay $t_d$ is the time from time T2 to time T2+ in FIG. 4. The offset voltage $V_{OFST}$ can be further adjusted to compensate for the propagation delay $t_d$ by an amount that depends on the rate of decrease of the inductor current $I_{IN}$ and the resistance of the GND switch. Specifically, since the voltage on the output node 316 is based on the inductor current $I_{IN}$, and the inductor current $I_{IN}$ decreases during the propagation delay $t_d$, the voltage at node 316 changes by a corresponding amount during the propagation delay $t_d$.

The voltages V1-V4 shown in FIG. 4 are examples provided to explain and illustrate adjustments to the offset voltage $V_{OFST}$ due to propagation delay. The voltages V1-V4 represent differences between the voltage $V_{316}$ on the input 332 and a voltage on the input 334 of the comparator 330 for different voltage and load combinations. The voltages V1 and V3 are not adjusted by offset voltage applied to the input 334. The voltages V2 and V4 are adjusted by an offset voltage $V_{OFST}$. The voltages V1 and V2 are based on a first number of switch slices 314 and the voltages V3 and V4 are based on a second, larger number of switch slices 314. The output node 316 provides a negative voltage $V_{316}$ to the input 332 due to the inductor current $I_{IN}$ being drawn from the reference voltage node 328 (at 0 volts) and dropping to a negative voltage across a resistance of the ground switch 324. The voltages V1-V4 rise during the second clock state as the inductor current $I_{IN}$ decreases. In the example of voltage V1, the inductor current $I_{IN}$ reaches zero, and the voltage V1 reaches zero volts on the output node 316 at precisely time T2, but the output 336 of the comparator 330 does not indicate that the input 332 is at 0 volts until time T2+ due to the propagation delay time $t_d$.

If the DC-DC converter 300 had a fixed number of switch slices 314, the output voltage $V_{308}$ of the capacitor 308 remained constant, and the load 310 was unchanged, the inductor current $I_{IN}$ would be the same in every cycle. In other words, the inductor current $I_{IN}$ would be the same at time T1 in each cycle, and the rate of change (e.g., slope) of the inductor current $I_{IN}$ would be the same for each cycle, so the duration of the second clock state would be the same in each cycle. In this regard, the change in voltage on the comparator during the propagation delay $t_d$ would be consistent from cycle to cycle. Therefore, a predictable offset voltage could be applied to the input 334 of the comparator 330 in an amount corresponding to the voltage change on the input 332 over the time of the propagation delay $t_d$ of the comparator 330. An offset voltage $V_{OFST}$ compensating for the propagation delay of the comparator 330 is illustrated by the voltage V2. The offset voltage $V_{OFST}$ is generated by the offset voltage generator 338. V2 differs from V1 by the amount $V_{IN}$ changes during the propagation delay $t_d$. This difference causes the comparator 330 to detect the zero inductor current $I_{IN}$ early by an amount of the time delay $t_d$. In this manner, the comparator 330 detects the zero inductor current at a time T2 and produces an indication of zero current on the output 336 at precisely time T2. Due to the offset voltage $V_{OFST}$ applied to the input 334, the voltage V2 reaches 0 volts at time T2− and the zero current indication is produced at time T2.

However, the DC-DC converter 300 does not have a fixed number of switch slices 314. As the number of switch slices 314 used in parallel increases, a resistance of the switch 312 is reduced, reducing the slope of the change in voltage $V_{316}$ at node 316. For example, the voltages V3 and V4 in FIG. 4 correspond to the voltages V1 and V2 but are based on a different rate of change of the voltage than the voltages V1 and V2 to represent the switch 312 using a different number of the switch slices 314. The voltages V3 and V4 are examples in which the switch 312 has a lower resistance due to more switch slices 314 being activated, which creates a smaller negative voltage on the output node 316. Consequently, the rate of change (i.e., slope) of the voltage $V_{316}$ differs from the voltages V1 and V2.

In another aspect, a rate of change of the inductor current $I_{IN}$ (e.g., time-slope) is modified by a change in output voltage $V_{308}$. This change in output voltage $V_{308}$, in combination with a change in resistance of the switch 312, causes a change in slope of the voltage $V_{316}$ at output node 316. Hence, there are two mechanisms that cause the change in slope of the voltage $V_{316}$: (i) a change in resistance of the switch 312; and (ii) a change in the output voltage $V_{308}$. However, only the change in output voltage $V_{308}$ causes the change in the time-slope of the inductor current $I_{IN}$. Either of these mechanisms, or a combination thereof, can cause a change in the slope of the voltage $V_{316}$.

Without an offset voltage being applied to the comparator 330, the voltage V3 reaches 0 volts at time T2, and a change in the output 336 is produced at time T2+ due to the propagation delay $t_d$. In contrast, with an appropriate offset voltage applied to the input 334 of the comparator 330, the voltage V4 on the input 332 is equal to the voltage on the input 334 at time T2−, producing an indication on the output 336 at precisely the time T2 due to the propagation delay time $t_d$. Stated differently, the comparator 330 generates the zero current indication ZCD on the output 336 in synchronization with a voltage at node 316 on the second input 334 being equal to a change in the voltage during the propagation delay. These examples are provided to show that, for different numbers of switch slices 314 employed in the switch 312, there would be different slopes of the voltage at node 316, so different offset voltages are needed in each case. As explained below, the control circuit 302 controls the offset voltage $V_{OFST}$ that is provided to the comparator 330 based on a stored offset value 348.

Returning to FIG. 3, an exemplary control circuit 302 of the DC-DC converter 300 includes the calibration circuit 304 to determine an offset voltage for each width (i.e., each number of switch slices 314) of the switch 312. The control circuit 302 uses the calibration circuit 304 to perform a calibration process, which is an incremental method of determining an offset voltage.

The calibration circuit 304 includes a freewheel switch 340 coupled to the first terminal 318 and the second terminal 320 of the inductor 306. The calibration circuit 304 also includes a calibration comparator 342. The calibration process may be initiated each time power is initially provided to the DC-DC converter 300 after being powered down, for example. The calibration process may also or alternatively be initiated in response to a command from a processor or a signal from an external circuit.

The calibration process begins prior to normal operation. The control circuit 302 provides a first width signal $W_{312}$ to the switch 312 to activate a first number of the switch slices 314. The control circuit 302 cycles the first clock signal CLK1 and the second clock signal CLK2 through the first clock state, the second clock state, and the third clock state. A default offset value corresponding to a default offset voltage may be employed in the second clock state of the first cycle. In some examples, the default offset voltage may be 0 volts or a known offset voltage associated with the voltage offset of the comparator 330. When the output 336 of the comparator 330 indicates the zero inductor current $I_{IN}$, the second clock signal CLK2 is deactivated to decouple the first terminal 318 from the reference voltage node 328.

At this time, the freewheel switch 340 is activated (e.g., closed) to couple the first terminal 318 to the second terminal 320 of the inductor 306. If the inductor current $I_{IN}$ is not zero, the inductor current $I_{IN}$ will begin to flow through the freewheel switch 340. The freewheel switch 340 may have a sufficiently high resistance that, even if the inductor current $I_{IN}$ in the freewheel switch 340 is small, there will be a significant voltage drop across the freewheel switch 340 in the direction of current flow. Inputs 344, 346 of the calibration comparator 342 are coupled to the first terminal 318 and the second terminal 320, and the calibration comparator 342 is configured to determine a direction of the inductor current $I_{IN}$ based on a voltage difference between the first terminal 318 and the second terminal 320. If the current is found to be in the positive direction, the zero current detection is occurring too early, and the offset voltage needs to be increased. If the current is found to be in the negative direction, the zero current detection is occurring too late, and the offset voltage needs to be decreased. Alternatively, an offset voltage (e.g., positive or negative, as needed) may be applied to the input 332. In this case, in response to the zero current detection occurring too early, the offset voltage needs to be decreased, and if the zero current detection is occurring too late, the offset voltage needs to be increased.

Increasing or decreasing the offset voltage may include increasing or decreasing an offset value. For example, an offset value implemented as a digital code (e.g., multi-bit binary code) may be increased or decreased by incrementing or decrementing the initial or current digital code. In this regard, during the third clock state in calibration mode, the control circuit 302 may control the calibration circuit to determine an inductor current direction based on a voltage difference between the first terminal 318 of the inductor 306 and the second terminal 320 of the inductor 306. The control circuit 302 can increment the offset value in response to the inductor current direction comprising a first direction, which corresponds to the voltage difference having a first polarity. The control circuit 302 can decrement the offset value corresponding to the selected load voltage and load current in response to the inductor current direction comprising a second direction, which corresponds to the voltage difference having a second polarity.

The freewheel switch 340 is deactivated (opened) when the first clock state of the next cycle begins. The current direction may be determined in each third clock state for several consecutive cycles until an optimal offset voltage is identified and the corresponding offset value 348 is stored in association with the width $W_{312}$ of the switch 312. An optimal offset voltage is one that minimizes the residual inductor current $I_{IN}$ present in the inductor 306 when the zero current detection signal ZCD is activated. For example, an optimal offset voltage may be determined in response to consecutive direction determinations changing from a first direction to a second direction, which would be indicated by a change in voltage polarity on the freewheel switch 340 in consecutive cycles. Later, when the control circuit 302 controls the switch 312 to operate with the width $W_{312}$, the offset voltage $V_{OFST}$ that is provided to the comparator 330 is based on the stored offset value 348.

The above calibration process can be used to determine an offset voltage dynamically for a DC-DC converter that operates at a same voltage and load for an extended time before changing to another voltage and/or load. Initially (e.g., for a few cycles), the DC-DC converter would operate with some inefficiency until an optimal compensation voltage is determined, but power consumption would be minimized for the remainder of the period of operating at a consistent voltage and/or load. The dynamic determination of an offset voltage includes using an initial offset value corresponding to an initial offset voltage in a first cycle of operation. However, the above offset voltage determination method may not significantly reduce power consumption in DC-DC converters where the voltage and/or load changes more frequently.

In the DC-DC converter 300, there may be a need to change the width of the switch 312 frequently, which reduces the efficiency of determining the offset voltage dynamically each time the width changes, as described above. In an exemplary aspect, the control circuit 302 stores the offset value corresponding to the offset voltage determined for the first width of the switch 312. The offset value 348 may be stored in a storage accessible to the control circuit 302. The offset values 348 may be stored as binary value stored in a register, wherein the storage 350 is one or more registers within the control circuit 302 or external to the control circuit 302. The offset values 348 may also be stored in a memory accessible to the control circuit 302. As an alternative, the stored offset value 348 comprises an analog value corresponding to a voltage on a capacitor, wherein the storage 350 is one or more capacitors that are charged according to the offset values 348. The calibration process is repeated in the same manner for each different width of the switch 312. Normal operation can begin once an offset value for each of the widths of the switch 312 has been determined and stored. Based on a selected load voltage and load current, the DC-DC converter 300 generates a width signal $W_{312}$ and retrieves a stored offset value 348 corresponding to a selected load voltage and current from the storage 350 or external memory. The stored offset value 348 is selected from a plurality of stored offset values 348, each corresponding to an output voltage on a selected one of the capacitors C1-C3 and a number of switch slices 314. The control circuit 302 controls an offset voltage $V_{OFST}$ provided to the comparator 330 based on the stored offset value 348.

The offset value 348 is provided to the offset voltage generator 338 to determine the offset voltage $V_{OFST}$ that is provided to the input 334 of the comparator 330. In a second clock state, the comparator 330 detects zero inductor current $I_{IN}$ based on the voltage at node 316 on the input 332 and the reference voltage $V_{SS}$ differing by an amount equal to the offset voltage $V_{OFST}$. The detection of zero inductor current $I_{IN}$ precedes the inductor current $I_{IN}$ actually reaching zero by a time equal to the propagation delay $t_d$ of the comparator 330. Thus, a zero current indication ZCD is generated by the comparator 330 in synchronization with (e.g., at the same time as) the inductor current $I_{IN}$ reaching zero. In response to detecting the zero inductor current $I_{IN}$, the comparator 330 generates a zero current indication ZCD.

Figure 5:
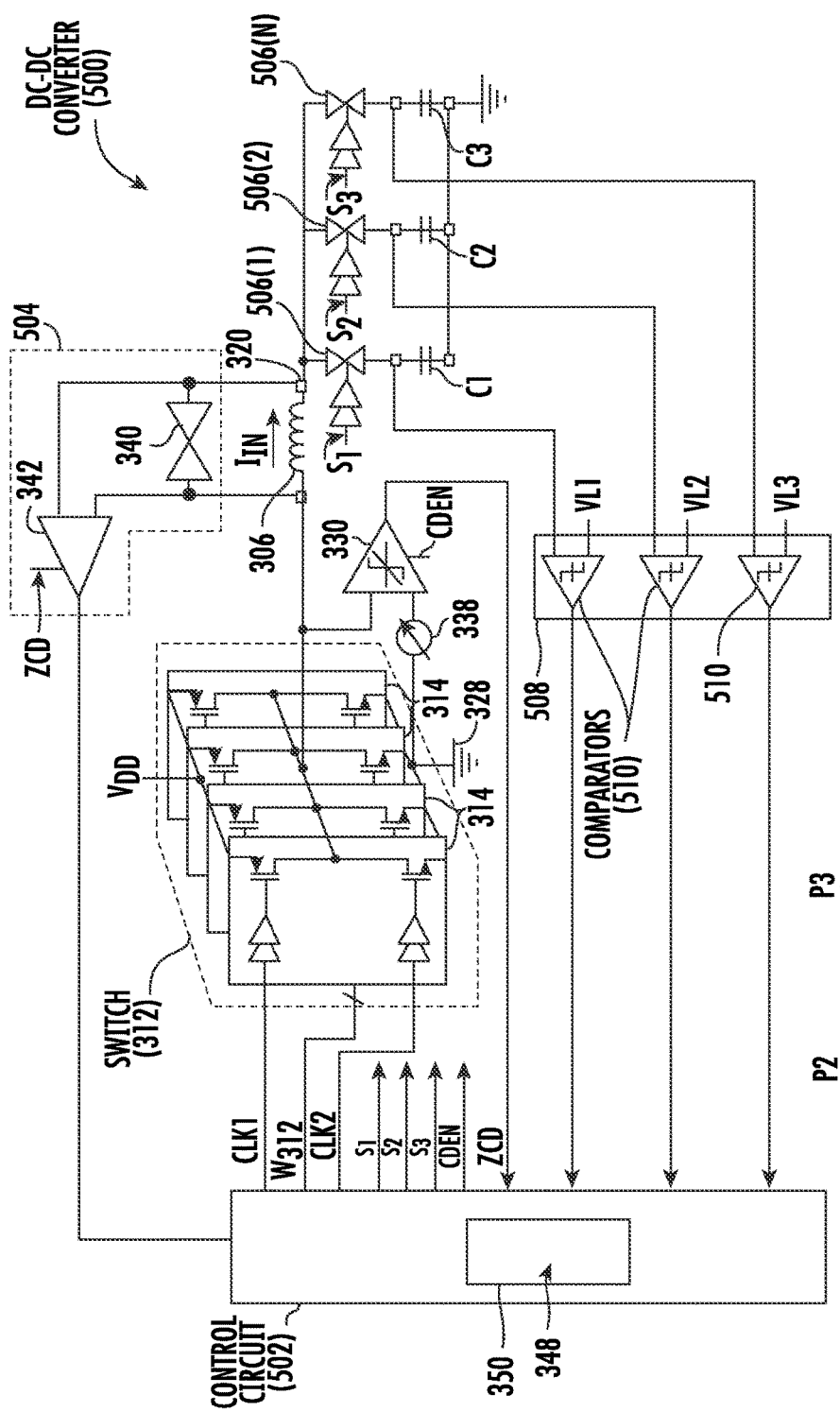
FIG. 5 is a schematic diagram of an exemplary DC-DC converter for single-input multiple-output (SIMO) operation and the control circuit to calibrate and store offset values of offset voltages for different load voltage and current combinations.

FIG. 5 is a schematic diagram of an exemplary DC-DC converter 500 for single-input multiple-output (SIMO) operation and employing a control circuit 502, including a calibration circuit 504 that may be the control circuit 302 in FIG. 3. The DC-DC converter 500 in FIG. 5 corresponds in many aspects to the DC-DC converter 300 in FIG. 3. Other elements of FIG. 5, also shown in FIG. 3, are numbered alike and are not described again in detail to avoid redundancy.

The DC-DC converter 500 is configured to provide power to a plurality of loads (not shown) sequentially in a time-division manner. The second terminal 320 of the inductor 306 is coupled to load switches 506(1)-506(N), where "N" is an integer. In this example, N=3, but the integer N may be greater or less than three (3). One of the load switches 506(1)-506(N) is activated at a time by the switch select signals $S_1$, including switch select signal $S_1$-$S_N$, respectively, for a selected load voltage and current for a load among a plurality of loads. The load switches 506(1)-506(N)

are configured to couple the inductor circuit 306 to one of the first capacitor C1 and the second capacitor C2. As shown in FIG. 5, the switch select signal $S_1$ may be activated for a first period P1 to charge a first capacitor C1. The switch select signal $S_2$ may be activated for a second period P2 to charge a capacitor C2, and the switch select signal $S_3$ may be activated next for a third period P3 to charge a capacitor C3. This sequence may be repeated. The capacitors C1, C2, and C3 may each have different capacitances and may provide power to respective loads (not shown) that operate at different voltages VL1, VL2, and VL3. The first period P1, second period P2, and third period P3 may differ in length (e.g., of time), and the duration of the first, second, and third clock states may differ among the periods P1-P3. There may be a different maximum inductor current $I_{IN}$ in each of the periods P1-P3.

The DC-DC converter 500 is an example for which the incremental dynamic determination of offset voltage is not available because the voltage and load changes with each cycle of the first clock CLK1 and the second clock signal CLK2. Here, the control circuit 502 is able to quickly change the width of the switch 312 as well as the output voltage from cycle to cycle to correspond to a load 310. An offset value 348 is stored in the storage 350 for each selected voltage and selected switch width. Power efficiency is maintained by performing the calibration process described above with respect to FIG. 3 for each combination of a number of the switch slices 314 and a selected one of the capacitors C1-C3, and storing the offset values 348 that provide optimal offset voltages for each combination. For example, in a calibration process, for each selected one of the capacitors C1-C3 and each number of switch slices 314, the control circuit 502 cycles the first and second clock signals through the first, second and third clock states. In each third clock state, the control circuit 502 controls the calibration comparator 342 to determine the direction of the inductor current $I_{IN}$, increment an offset value corresponding to the selected one of the capacitors C1-C3 and the number of switch slices 314 in response to the inductor current $I_{IN}$ in a first direction, and decrement the offset value corresponding to the selected one of the capacitors C1-C3 and the number of switch slices 314 in response to the inductor current $I_{IN}$ in a second direction. The control circuit 502 in the calibration process stores, in the storage 350, the offset value corresponding to the selected one of the capacitors C1-C3 and the number of switch slices 314.

An offset voltage needs to be determined for each combination of a load voltage and a load current in a calibration process. For example, if the number of switch slices 314 in the switch 312 is "X" and the number of different loads (e.g., voltages) is "Y," the calibration process would determine and store (X×Y=Z) offset values for each combination of X and Y in the storage 350.

Once calibration is complete, operation of the DC-DC converter 500 in FIG. begins at time T0. The switch select signal $S_1$ corresponds to a voltage VL1 provided to a load coupled to the capacitor C1. The control circuit 502 also determines the width signal $W_{312}$, which indicates a number of the switch slices 314 that can efficiently provide the inductor current $I_{IN}$ for the load coupled to the capacitor C1 in the period P1. Based on the combination of the selected voltage and the selected load, the control circuit 502 accesses the storage 350 to retrieve the offset value 348 associated with the combination and applies an offset value previously determined in the calibration process. The offset value 348 corresponds to an offset voltage applied to the comparator 330. At time T2, switch select signal $S_2$ is selected, the width $W_{312}$ is updated, and the associated offset value 348 is retrieved to determine an offset voltage to be applied to the comparator 330. At time T3, switch select signal $S_3$ is selected, and the associated offset value 348 is retrieved to determine an offset voltage to be applied to the comparator 330.

The DC-DC converter 500 also includes voltage comparators 508-510 coupled to respective capacitors C1-CN. The comparators 508-510 are also coupled to reference voltages, which may correspond to operating voltages VL1-VL3. The comparators 510 generate feedback signals 512(1)-512(N) to the control circuit 502.

The control circuit 502 may be programmed or controlled by software but includes hardware circuits.

Figure 6:
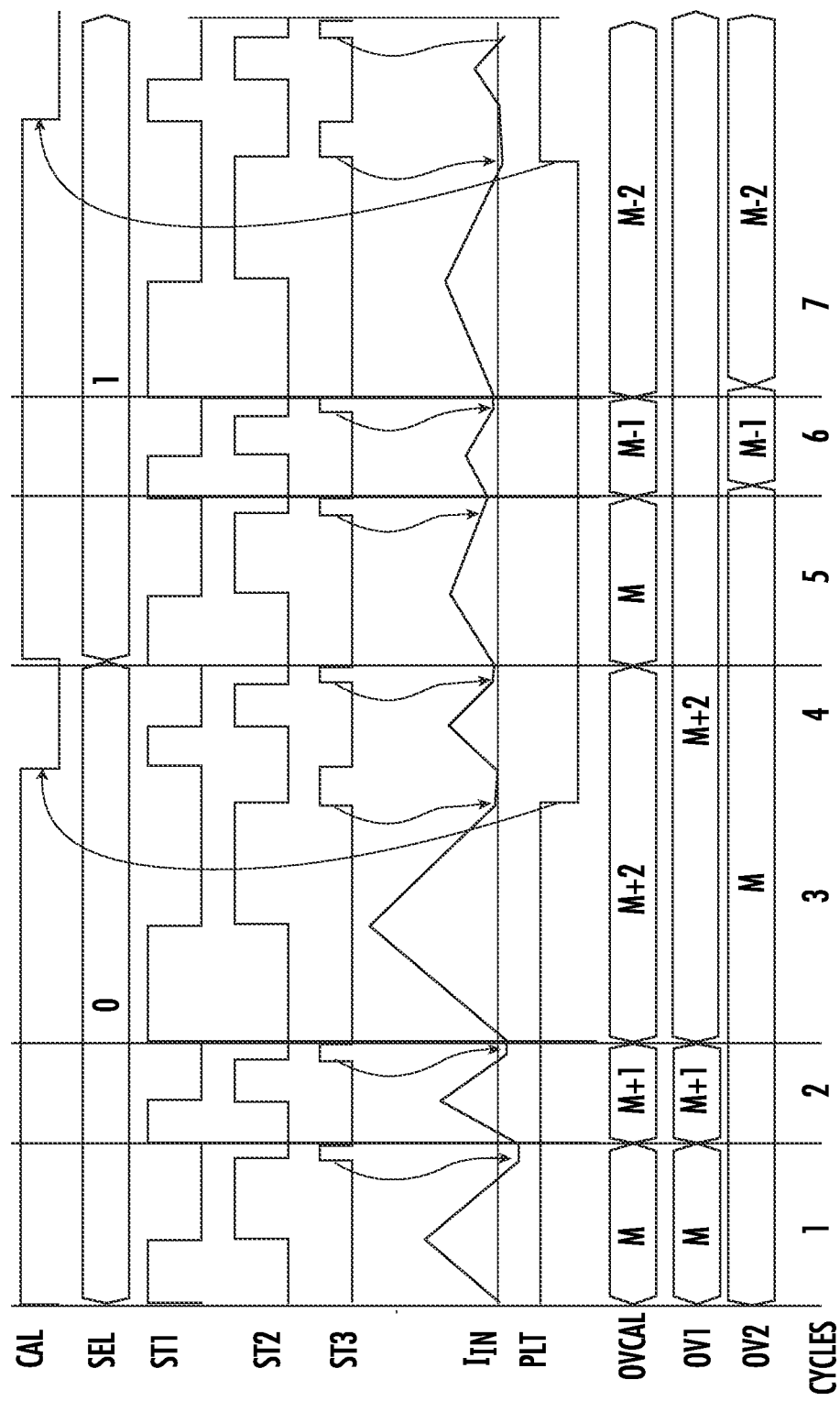
FIG. 6 is a timing diagram of inductor voltage and current in the DC-DC converter in a calibration process for determining offset voltages for combinations of load voltage and current.

FIG. 6 is a timing diagram of inductor voltage $V_{IN}$ and current $I_{IN}$ in the DC-DC converter 500 in a calibration process for determining offset voltages for combinations of load voltage and current. Starting from the top, a calibration activation signal CAL indicates when a calibration process for a load voltage and current combination is enabled. The selected combination of load voltage and current are indicated by the signal SEL, which indicates that calibration begins with a voltage and load identified by "0". The timing diagram includes the clock state indications ST1, ST2, and ST3, which indicate the first clock state, second clock state, and third clock state, respectively. The inductor current $I_{IN}$ is shown with reference to a zero current line. The signal PLT is a polarity indicator that changes polarity when the polarity of the voltage on the freewheel switch 540 changes from one cycle to the next. The signal OVCAL is the offset voltage used to indicate an offset voltage provided to the comparator during calibration. The signals OV1 and OV2 are the offset values being determined for the load voltage and current combination 0 and combination 1 in this calibration process. The timing diagram indicates time moving from left to right.

The calibration process begins at time T0 with the calibration activation signal CAL being activated and the load voltage and current combination 0, as indicated by SEL.

The inductor current $I_{IN}$ increases in the first clock state, decreases in the second clock state, and remains stable near zero in the third clock state of every cycle. The offset voltage applied to the comparator initially is based on the OVCAL=M, which may be a default offset value to start calibration. Both OV1 and OV2 start at the default offset value M.

In the third clock state of cycle 1, which is indicated by ST3 being active, the inductor current $I_{IN}$ is negative, so OVCAL is incremented to M+1. In the third clock state of cycle 2, the inductor current $I_{IN}$ is still negative, to OVCAL is incremented to M+2. In the third clock state of cycle 3, the inductor current $I_{IN}$ is positive, so the signal PLT changes polarity. In this example, the calibration process for setting the offset voltage OV1 for a combination of load voltage and current stops when the polarity changes. Therefore, the calibration activation signal CAL is deactivated in cycle 4. The offset voltage OV1 for combination 0 remains at M+2. The signal SEL is changed to "1", indicating a next load voltage and current combination as the calibration process is resumed by setting the offset voltage OVCAL to M and reactivating the calibration activation signal CAL.

As the calibration process restarts, the OVCAL is set to M. In the third clock state of the cycle 5, the inductor current $I_{IN}$ is positive, so the OVCAL and OV2 is decremented to M−1. In the third clock state of the cycle 6, the inductor current $I_{IN}$ is still positive, so the OVCAL and OV2 is decremented again to M−2. In the third clock state of the cycle 7, the inductor current $I_{IN}$ is negative, so the signal PLT changes polarity and the calibration signal CAL is deactivated. The offset voltage for combination 1 remains at M−2. This process could continue for other values SEL. In normal operation, the control circuit identifies a combination of load voltage and current, retrieves the offset value 348 stored in the storage 350 during the calibration process, and provides a corresponding offset voltage to the comparator 330 for accurate zero inductor current detection.

Those skilled in the art will recognize improvements and modifications to the embodiments of the present disclosure. All such improvements and modifications are considered within the scope of the concepts disclosed herein and the claims that follow.

What is claimed is:

1. A direct-current (DC) to DC (DC-DC) converter comprising:
   an inductor coupled to a first capacitor, the inductor configured to charge the first capacitor to a first load
   a switch circuit coupled to the inductor, wherein, in response to a first clock signal and a second clock signal, the switch circuit comprising a plurality of switch slices and configured to receive a width signal indicating a number of switch slices of the plurality of switch slices to be activated and configured to:
      couple the inductor to a power supply providing a supply voltage in a first clock state;
      couple the inductor to a reference voltage node in a second clock state; and
      decouple the inductor from the power supply and the reference voltage node in a third clock state;
   a comparator configured to generate a zero current indication in response to detecting zero inductor current in the inductor in the second clock state;
   a control circuit configured to control:
      the first clock signal and the second clock signal to switch from the second clock state to the third clock state in response to the zero current indication, and
      based on a stored offset value, an offset voltage provided to the comparator;
   a first load switch and a second load switch; and
   a second capacitor, wherein:
      the first capacitor is configured to provide the first load voltage to a first load;
      the second capacitor is configured to provide a second load voltage to a second load; and
      the first load switch and the second load switch are configured to couple the inductor to a selected one of the first capacitor and the second capacitor.

2. The DC-DC converter of claim 1, the control circuit further comprising a register, wherein the stored offset value comprises a binary value stored in the register.

3. The DC-DC converter of claim 1, the control circuit further comprises a second capacitor, wherein the stored offset value comprises an analog value corresponding to a voltage on the second capacitor.

4. The DC-DC converter of claim 1, further comprising an offset voltage generator configured to supply the offset voltage on a first input of the comparator based on the stored offset value.

5. The DC-DC converter of claim 4, wherein the comparator comprises:
   a second input;
   an output configured to generate the zero current indication indicating that a first voltage on the first input differs from a second voltage on the second input by the offset; and
   a propagation delay from detecting that the first voltage and the second voltage differ by the offset voltage to generating the zero current indication on the output.

6. The DC-DC converter of claim 5, wherein:
   the offset voltage generator is coupled to the first input of the comparator and to the reference voltage node configured to supply a reference voltage; and
   the first voltage comprises the offset voltage added to the reference voltage.

7. The DC-DC converter of claim 6, wherein, in the second clock state:
   the inductor current is configured to decrease at a first rate based on the first load voltage;
   the second voltage decreases at a second rate corresponding to the first rate; and
   the comparator is configured to generate the zero current indication on the output based on the second rate and the propagation delay.

8. The DC-DC converter of claim 1, wherein each switch slice of the plurality of switch slices comprises:
   a first switch configured to couple the power supply to an output node coupled to the inductor, the first switch controlled by the first clock signal; and
   a second switch configured to couple the reference voltage node to the output node, the second switch controlled by the second clock signal.

9. The DC-DC converter of claim 1, wherein the stored offset value is selected from a plurality of stored offset values, each corresponding to a voltage of the selected one of the first capacitor and the second capacitor.

10. The DC-DC converter of claim 1, wherein, the stored offset value is selected from a plurality of stored offset values, each corresponding to the number of switch slices of the plurality of switch slices to be activated.

11. The DC-DC converter of claim 1, the control circuit further comprising a calibration circuit comprising:
    a freewheel switch coupled to a first terminal of the inductor and a second terminal of the inductor; and
    a calibration comparator coupled to the first terminal of the inductor and the second terminal of the inductor and configured to determine a direction of the inductor current in the inductor.

12. The DC-DC converter of claim 11, wherein, in a calibration process:
    the control circuit is further configured to cause the first clock signal and the second clock signal to cycle through a plurality of sequences of the first clock state, the second clock state, and the third clock state; and
    in the third clock state of each sequence:
       activate the freewheel switch; and
       control the calibration comparator to determine the direction of the inductor current based on a voltage difference between the first terminal of the inductor and the second terminal of the inductor to determine whether the offset voltage should be increased or decreased.

13. The DC-DC converter of claim 12, wherein:
    in response to determining the offset voltage should be increased, the control circuit is further configured to increment an offset value;
    in response to determining the offset voltage should be decreased, the control circuit is further configured decrement the offset value; and
    the control circuit is configured to store the offset voltage.

14. The DC-DC converter of claim 13, wherein:
    for each of the first capacitor and the second capacitor, the control circuit is configured to:

select a corresponding number of switch slices; and
store the offset voltage in a corresponding register.

15. A device comprising:
a power supply input configured to receive power at a first voltage;
a load circuit configured to receive power at a second voltage; and
a direct-current (DC) to DC (DC-DC) converter configured to convert the power at the first voltage to power at the second voltage, the DC-DC converter comprising:
an inductor coupled to a first capacitor to charge the first capacitor to a first load voltage;
a switch circuit coupled to the inductor, wherein, in response to a first clock signal and a second clock signal, the switch circuit:
couples the inductor to a power supply providing a supply voltage in a first clock state;
couples the inductor to a reference voltage node in a second clock state; and
decouples the inductor from the power supply and the reference voltage node in a third clock state;
a comparator that generates a zero current indication in response to detecting zero inductor current in the inductor in the second clock state;
a control circuit that controls the first clock signal and the second clock signal to switch from the second clock state to the third clock state in response to the zero current indication, and controls, based on a stored offset value, an offset voltage provided to the comparator;
a first load switch;
a second load switch;
a second capacitor; and
a second load circuit,
wherein:
the first capacitor is configured to provide the first load voltage to load circuit;
the second capacitor is configured to provide a second load voltage to the second load; and
the first load switch and the second load switch are configured to couple the inductor to a selected one of the first capacitor and the second capacitor.

16. The device of claim 15, the DC-DC converter further comprising an offset voltage generator to supply the offset voltage on a first input of the comparator based on the stored offset value.

17. The device of claim 16, wherein the comparator comprises:
a second input;
an output to generate the zero current indication indicating that a first voltage on the first input differs from a second voltage on the second input by the offset voltage; and
a propagation delay from detecting that the first voltage and the second voltage differ by the offset voltage to generating the zero current indication on the output.

18. The device of claim 15, the control circuit further comprising a calibration circuit comprising:
a freewheel switch coupled to a first terminal of the inductor and a second terminal of the inductor; and
a calibration comparator coupled to the first terminal of the inductor and the second terminal of the inductor and configured to determine a direction of the inductor cuent in the inductor, wherein, in a calibration process:
the control circuit is further configured to cause the first clock and the second clock to cycle through a plurality of sequences of the first clock state, the second clock state, and the third clock state; and
in the third clock state of each sequence:
activate the freewheel switch; and
control the calibration comparator to determine the direction of the inductor current based on a voltage difference between the
first terminal of the inductor and the second terminal of the inductor to determine whether the offset voltage should be increased or decreased.

19. A method for controlling a direct current-to-direct current, DC-DC, converter comprising:
charging a first capacitor to a first load voltage with an inductor coupled to the first capacitor;
responsive to first clock signal and a second clock signal being received by a switch circuit comprising a first switch and a second switch:
coupling with the first switch, the inductor to a power supply that provides a supply voltage in a first clock state controlled by the first clock signal;
coupling with the second switch, the inductor to a reference voltage node in a second clock state controlled by the second clock signal;
decoupling the inductor from the power supply and the reference voltage node in a third clock state;
generating a zero current indication with a comparator responsive to detecting zero inductor current in the inductor in the second clock state;
determining with a calibration comparator coupled to a first terminal of the inductor a direction of inductor current in the inductor;
controlling with a control circuit the first clock signal and the second clock signal to switch from second clock state to the third clock state responsive to the zero current indication;
controlling with the control circuit an offset voltage provided to the comparator based on a stored offset value; and
calibrating by:
causing the first clock signal and the second clock signal to cycle through a plurality of sequences of the first clock state, the second clock state, and the third clock state; and
while in the third clock state of each sequence:
activating a freewheel switch coupled to the first terminal of the inductor; and
controlling the calibration comparator to determine the direction of the inductor current based on a voltage difference between the first terminal of the inductor and a second terminal of the inductor to determine whether the offset voltage should be increased or decreased.

* * * * *

UNITED STATES PATENT AND TRADEMARK OFFICE
CERTIFICATE OF CORRECTION

| | | |
|---|---|---|
| PATENT NO. | : 12,483,108 B2 | Page 1 of 1 |
| APPLICATION NO. | : 18/117545 | |
| DATED | : November 25, 2025 | |
| INVENTOR(S) | : Vikram Chaturvedi and Salvatore Pirruccio | |

It is certified that error appears in the above-identified patent and that said Letters Patent is hereby corrected as shown below:

In the Specification

In Column 13, Line 55, replace "in FIG. begins" with --in FIG. 5 begins--.

In the Claims

In Column 18, Line 4, replace "inductor cuent" with --inductor current--.

Signed and Sealed this
Sixth Day of January, 2026

John A. Squires
*Director of the United States Patent and Trademark Office*